(12) United States Patent
Ho et al.

(10) Patent No.: US 7,058,074 B2
(45) Date of Patent: Jun. 6, 2006

(54) UNIFIED CHANNEL ACCESS FOR SUPPORTING QUALITY OF SERVICE (QOS) IN A LOCAL AREA NETWORK

(75) Inventors: Jin-Meng Ho, Plano, TX (US); Donald P. Shaver, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1049 days.

(21) Appl. No.: 09/967,164

(22) Filed: Sep. 28, 2001

(65) Prior Publication Data

US 2002/0071449 A1   Jun. 13, 2002

Related U.S. Application Data

(60) Provisional application No. 60/253,252, filed on Nov. 27, 2000, provisional application No. 60/244,993, filed on Nov. 1, 2000.

(51) Int. Cl.
*H04L 12/413*  (2006.01)
*H04L 12/403*  (2006.01)
*H04L 12/42*   (2006.01)

(52) U.S. Cl. .................................. 370/447; 370/449
(58) Field of Classification Search ............. 370/445, 370/447–457
See application file for complete search history.

(56) References Cited

U.S. PATENT DOCUMENTS 6,006,017 A   12/1999   Joshi et al.

6,813,260 B1 * 11/2004 Fogle .................... 370/338

OTHER PUBLICATIONS

Deng, Dr-Jiunn, et al., "A Priority Scheme for IEEE 802.11 DCF Access Method," IEICE Transactions on Communications, Institute of Electronics Information and Comm. Eng., Tokyo, Japan, vol. E82-B, No. 1, Jan. 1999, pp. 96-102, XP000927880.

Bononi, Luciano, et al., "Design and Performance Evaluation of a Distributed Contention Control (DCC) Mechanism for IEEE 802.11 Wireless Local Area Networks," Journal of Parallel and Distributed Computing, Academic Press, Duluth, MN, US, vol. 60, No. 4, Apr. 2000, pp. 407-430, XP004408322.

(Continued)

*Primary Examiner*—Chi Pham
*Assistant Examiner*—Ronald Abelson
(74) *Attorney, Agent, or Firm*—Abdul Zindani; W. James Brady, III; Frederick J. Telecky, Jr.

(57) ABSTRACT

Contention communications often requires a station to wait an inordinate amount of time before the station is able to transmit its data successfully. In many applications, an extended delay is not acceptable. Contention-free communications in a contention period allows a hybrid coordinator (HC) to schedule contention-free access to a communications medium so that extended delays may be eliminated, and to coordinate contention access to the medium so that better throughput and delay performance is achieved. A method for creating contention-free communications within a contention communications period is presented, along with adaptive algorithms for contention access during the same contention period.

29 Claims, 5 Drawing Sheets

OTHER PUBLICATIONS

Information Technology-Telecommunications and Information Exchange Between Systems, Part 11, "Local and Metropolitan Area Networks: Wireless LAN Medium Access Control (MAC) and Physical (PHY) Specifications," Chapter 9, ISO/IEC 8802-11 ANSI/IEEE STD 802.11, XX, 1999, pp. 70-97, XP002236335.

* cited by examiner

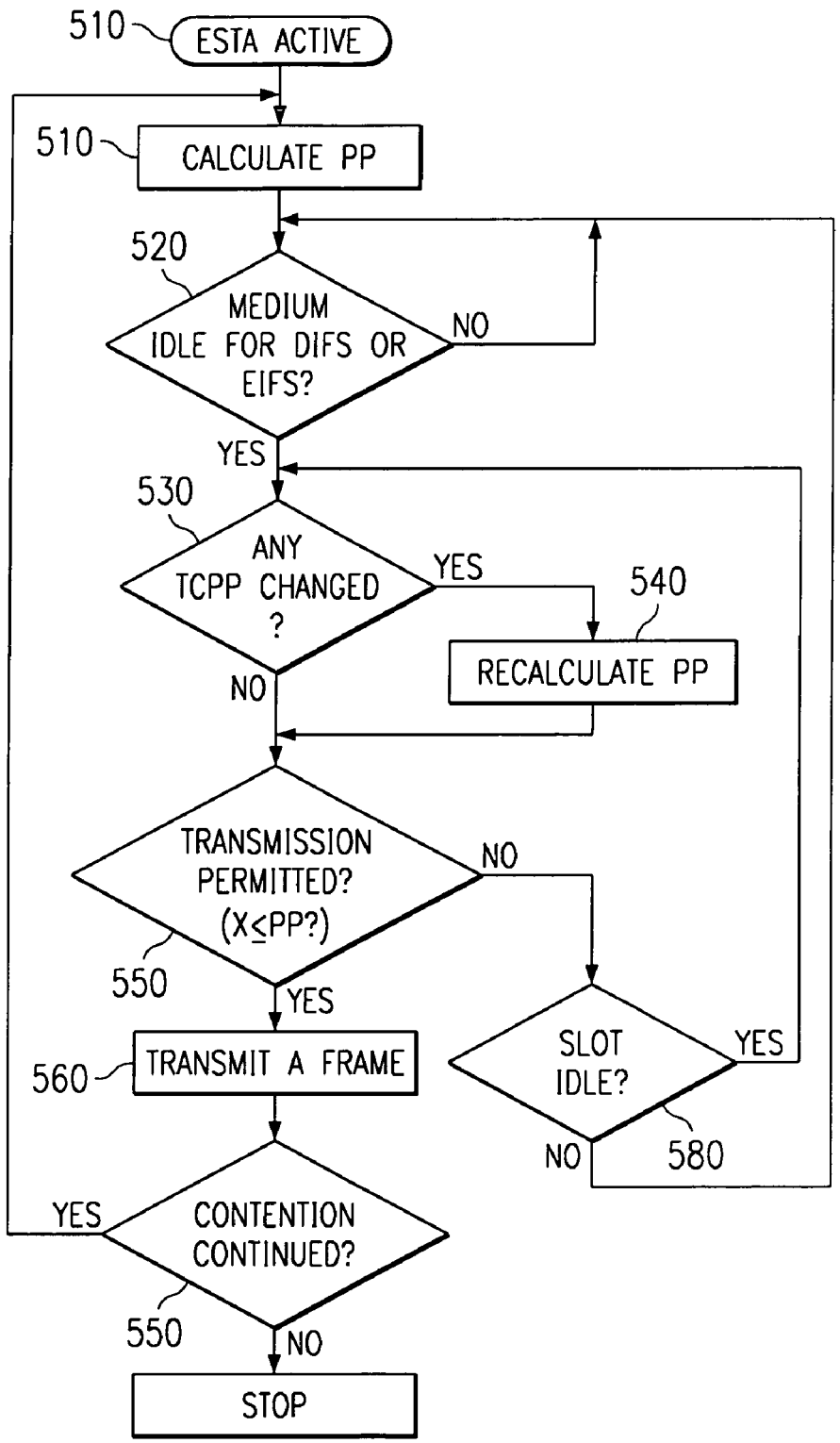

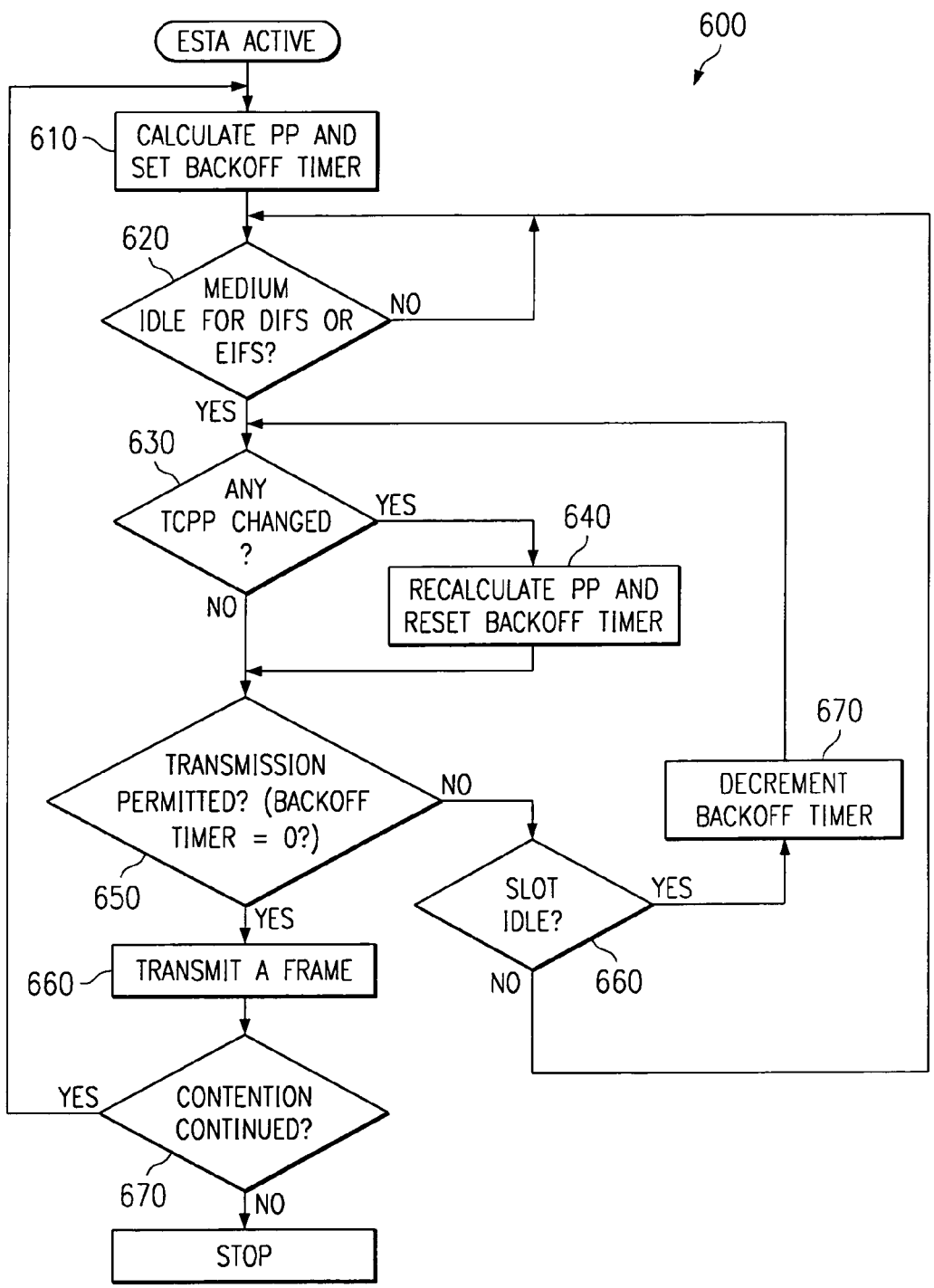

UNIFIED CHANNEL ACCESS FOR SUPPORTING QUALITY OF SERVICE (QOS) IN A LOCAL AREA NETWORK

This application claims priority to the provisional applications entitled "Probability Based Distributed Coordination Function (p-dcf) for Prioritized Quality of Service", filed Nov. 27, 2000, Ser. No. 60/253,252 and "A Probability Based Distributed Coordination Function (p-dcf) for Prioritized Quality of Service", filed Nov. 1, 2000, Ser. No. 60/244,993, which provisional applications are incorporated herein by reference.

CROSS REFERENCE TO RELATED APPLICATIONS

This invention is related to commonly-assigned patent applications: "Shared Communications Channel Access In an Overlapping Coverage Environment", filed Sep. 28, 2001, Ser. No. 09/966,393 and "Adaptive Algorithms for Optimal Control of Contention Access", filed Sep. 28, 2001, Ser. No. 09/966,635. These applications are incorporated herein by reference in their entirety.

1. Field of the Invention

This invention relates generally to networks and more particularly to providing hybrid contention-free and contention communications in a communications network that shares access of a common communications medium among multiple user stations.

2. Background of the Invention

Communications networks use a transmission medium to transmit information in the form of computer data, voice, music, video, etc., from one station to another. The communications medium may be a wired link, a fiber optic link, or a wireless link. The wireless link may include, but is not limited to, radio frequency, infrared, laser light, and microwave. The network may, in fact, use a combination of different communications links.

With the exception of a small number of networks that use dedicated communications links between each station, most information networks use a shared transmission medium to carry the transmitted information. Examples of information networks using a shared transmission medium include: Ethernet, token ring, and wireless Ethernet (IEEE 802.11).

However, by sharing a communications medium between multiple stations, there are situations that arise when stations are required to wait a significant amount of time before they are able to transmit their data. Additionally, situations exist when simultaneous transmissions from different stations occur and result in the mutual destruction of the transmissions. Such situations are undesirable in providing quality of service (QoS) to multimedia data transfers and in making efficient use of scarce spectrum on a wireless medium.

For some applications, such as voice telephony, video tele-conferencing, and other real-time, bi-directional, interactive applications, extended transfer times can severely and rapidly degrade the performance of the applications to a level that is unacceptable. For example, in voice telephony applications, if the delay between one user speaking and another user listening is greater than a few milliseconds, the delay becomes noticeable to the users and the users' satisfaction level for the telephone connection begins to drop.

One way to ensure that applications requiring a low maximum network latency receive the level of service that they require is to implement some form of QoS transfers of data traffic between stations. In many networks with QoS transfers, communications traffic in a network are partitioned into multiple categories and the categories are parameterized or prioritized according to their specific performance requirements. For example, traffic carrying a telephone conversation between two users will be given a higher priority than traffic carrying data for a file transfer between two computers. By creating categories for the traffic, parameterizing and prioritizing the different categories and ensuring that traffic of higher QoS demands or higher priority receives better service, these networks offer and meet performance guarantees.

In a network that uses a shared communications medium, one commonly used technique to ensure a minimum network performance level is to have a centralized controller controlling access to the communications medium instead of simply relying on a distributed algorithm or random chance to provide access control. At an interval of adjustable duration, the centralized controller polls the stations with data to transmit and grants each one of them a specified duration on the communications medium during which they are free to transmit their data without fear of collisions. Each polled station is then guaranteed to have time on the medium in line with its QoS expectations. This method is sometimes referred to as contention-free communications.

The opposite of contention-free communications is communications with contention, or contention communications. During contention communications, each station with data to transmit must contend with other stations for access to the communications medium. Algorithms, from simple to complex, arbitrate access to the communications medium. However, since the algorithms are non-deterministic and are usually based on a first-come-first-served paradigm, the wait that the stations must endure cannot be predicted, nor is the rate at which the stations can transmit their data. Therefore, communications by distributed contention cannot be used to implement QoS transfers. This is due to the fact that contention communications generally results in communications with low throughput and large delay and jitter.

In the IEEE 802.11 wireless local area network (LAN) technical specifications, provisions for both contention-free and contention communications have been provided in two separate communications periods. Each beacon interval is partitioned into a contention-free period (CFP) and a contention period (CP) for contention-free and contention communications, respectively, with frame exchanges between stations in the two periods employing different access rules and frame formats. As a result, QoS traffic transfer is complex to implement, channel throughput efficiency is relatively low, and co-channel interference mitigation and bandwidth sharing are not straightforward. Furthermore, in IEEE 802.11, the CFP is an option and most implementations of IEEE 802.11 wireless LANs do not support contention-free communications.

A need has therefore arisen for a methodology for providing hybrid contention-free and contention communications during a CP over a shared communications medium on a demand driven basis.

SUMMARY OF THE INVENTION

In one aspect, the present invention provides a method for providing contention-free transmissions during a contention period in a shared communications medium comprising the steps of capturing the shared communications medium, then permitting a recipient station an opportunity to transmit, and once the recipient station completes its transmission, recapturing the shared communications medium.

A preferred embodiment of the present invention has a principal advantage in that it permits and enables contention-free communications to take place in a contention period that does not normally support contention-free communications. By having contention-free communications, the network is able to implement a QoS plan and support a wide variety of communications applications that require guaranteed low-latency and certain data rate communications.

A preferred embodiment of the present invention has an additional advantage in that it still allows for contention communications to occur, in the midst of contention-free communications.

A preferred embodiment of the present invention has yet another advantage in that it provides an adaptive contention communications paradigm that has been shown to be equivalent to exponential backoff in fairness, but makes better use of available network bandwidth and degrades more gracefully when the number of stations in the network increases.

BRIEF DESCRIPTION OF THE DRAWINGS

The above features of the present invention will be more clearly understood from consideration of the following descriptions in connection with accompanying drawings in which:

FIG. 5 is a diagram displaying an adaptive, probability-based contention access algorithm according to a preferred embodiment of the present invention;

FIG. 6 is a diagram illustrating an adaptive, backoff-based contention access algorithm according to a preferred embodiment of the present invention;

DETAILED DESCRIPTION OF ILLUSTRATIVE EMBODIMENTS

Figure 1:
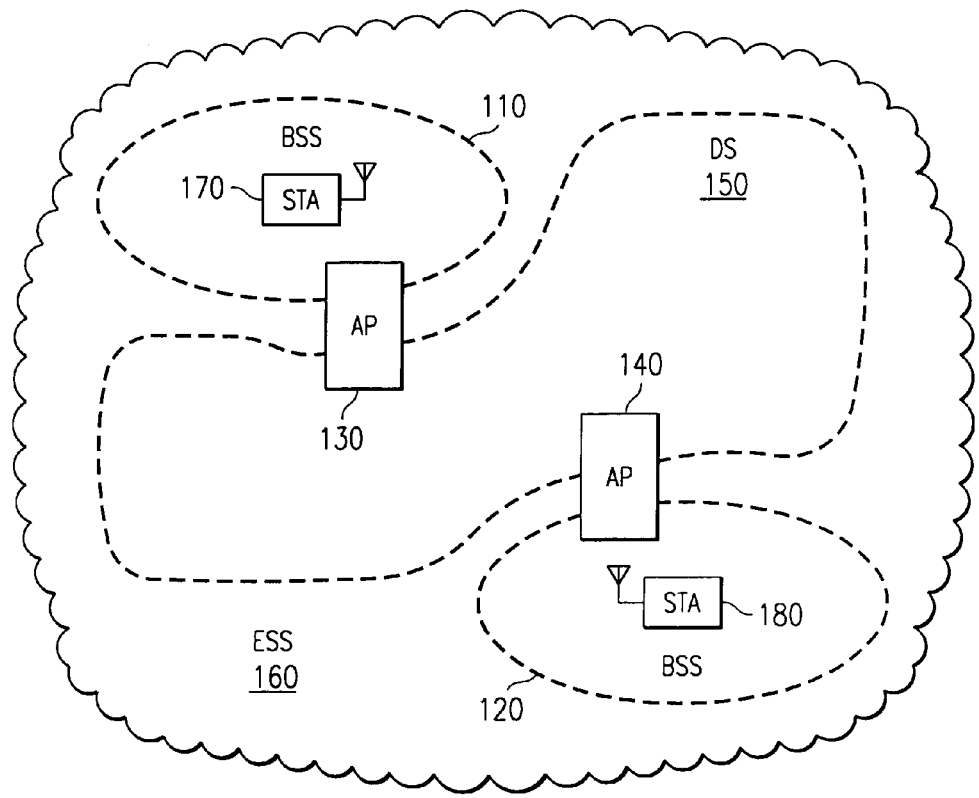
FIG. 1 is a diagram displaying a typical (prior art) configuration of a wireless local area network.

The making and use of the various embodiments are discussed below in detail. However, it should be appreciated that the present invention provides many applicable inventive concepts which can be embodied in a wide variety of specific contexts. The specific embodiments discussed are is merely illustrative of specific ways to make and use the invention, and do not limit the scope of the invention.

Sharing a communications medium is a necessity for a majority of the communications networks (networks) available today. Only in a small number of networks are there enough resources to permit dedicating communications media between pairs of users. For most purposes, dedicating a connection between pairs of users is an inefficient use of bandwidth resources. Sharing a communications medium between multiple users allow for more efficient use of the medium, because when one user may be idle, another user may have data to transmit. Sharing is also more cost efficient because a smaller amount of the media is needed to support the information network. Note that this is also true for wireless, over-the-air networks, where if sharing were not used, then more "air", i.e., spectrum, must be dedicated to supporting the network.

However, sharing a communications medium between multiple stations means that in certain circumstances, more than one station could desire access to the medium at the same time or a station may desire access when the medium is already busy. This is known as contention and contention leads to collision and waiting. Because only one station should have access to the communications medium at any given time, the other stations with data to transmit should wait until the first station is either finished transmitting or its allotted time is expired. However, since the stations do not have other channels over which they can coordinate their transmission times other than the channel they use for their data transmissions, the stations may transmit at the same time resulting in no data being successfully received. Such collisions waste channel bandwidth and further delay the traffic transfer.

Long delays leads to communications with large latencies. There are many communications applications that cannot tolerate high network latency. Examples include voice telephony applications, video tele-conferencing, and other real-time, bi-directional and interactive applications. These applications require a network that provides a low maximum network latency, a minimal data transfer rate, and other QoS expectations.

One step devised to meet QoS expectations involves categorizing traffic in the network and assigning QoS parameters and/or priorities to the different traffic categories. Network traffic with the low network latency requirements are assigned higher priorities to ensure that they are serviced before traffic with less stringent network latency requirements, hence the higher priority traffic is required to wait less. Traffic with lower priorities are sometimes required to wait an extended amount of time, but only applications that are not sensitive to extended wait-times are assigned low priorities. Applications such as data and file transfers are assigned low priorities, while applications such as voice and video transmissions are assigned high priorities.

Another step involves the use of contention-free communications. This is similar to the communications method used in token ring networks, where a station can communicate only when it has the "token." In networks implementing contention-free communications, a centralized controller (sometimes referred to as a point coordinator or a hybrid coordinator) communicates to the stations in the network, one at a time, telling the station that it may communicate for a specified amount of time. The station then is free to transmit for the specified duration. The station can transmit to any other station in the network without fear of a collision.

Referring now to FIG. 1, a diagram (prior art) of a typical wireless local area network (LAN) installation according to the IEEE 802.11 technical standard, "ANSI/IEEE Std 802.11, 1999 Edition; Information technology—Telecommunications and information exchange between systems—Local and metropolitan area networks—Specific requirements. Part 11: Wireless LAN Medium Access Control (MAC) and Physical Layer (PHY) Specifications," which is incorporated herein by reference. FIG. 1 provides an illustration of the basic building blocks of an IEEE 802.11 network.

FIG. 1 displays a first basic service set (BSS) 110 and a second BSS 120. A BSS is the basic building block of an IEEE 802.11 network and can be thought of as a coverage area within which member stations may participate in direct communications. A BSS is started, formed, and maintained by an access point (AP). BSS 110 corresponds to AP 130 and BSS 120 corresponds to AP 140. An AP is a station that is connected to a distribution system (DS) 150. A DS allows multiple BSSs to interconnect with one another and form an extended service set (ESS) 160. The medium used in a DS may be the same as the medium used in the BSSs or it may be different, e.g., the medium used in the BSSs may be wireless radio frequency (RF) while a DS may use fiber optic. Internal to BSS 110 is an AP 130 and a wireless station (STA) 170 while internal to BSS 120 is an AP 140 and a STA 180. A BSS may contain more than two stations (e.g., a maximum of about 20 stations per BSS is typical today), but it will have one AP.

As shown in FIG. 1, BSS 110 is connected to DS 150 via the access point 130 and the second access point 140 connects BSS 120 to DS 150. It should be noted that an access point also contains a wireless station and can be addressed like any other wireless station.

Stations within a BSS, for example, stations 130 and 170 in BSS 110, may communicate with one another without interfering with stations in other BSSs. However, the stations within a BSS cannot simply communicate whenever they wish; they must follow an established set of rules designed to minimize collisions and maximize performance.

A user may be thought of as a device or an entity that uses a station to communicate with other users who are using other stations to communicate. Therefore, in the remainder of this discussion, the terms stations and users will be used interchangeably without loss of information.

In an IEEE 802.11 wireless LAN, data, management, and control traffic are transmitted in what are called "units." Data and control traffic transmitted between two stations are called Medium Access Control (MAC) protocol data units (MPDU), while management traffic transmitted between two stations are called MAC management protocol data units (MMPDU). A unit may be fragmented if it is too large to fit within a single MAC frame and therefore may be fragmented into multiple MAC frames.

Timing is a crucial aspect of an IEEE 802.11 wireless LAN. Spans of time are used to prevent or allow certain types of communications. Other spans of time are used to begin and end communications. The most commonly referred time spans are SIFS, PIFS, and DIFS. A SIFS is a short inter-frame space and is typically the smallest time span in the LAN. A PIFS is a point coordinating function (PCF) inter-frame space. A PIFS is equal to one SIFS plus one slot time. A DIFS is a distributed coordinating function (DCF) inter-frame space. A DIFS is equal to one PIFS plus one slot time. A slot time is the maximum amount of time for a station to sense a frame, due to signal processing delay and propagation delay, that is transmitted from any other station within a BSS.

As described previously, a station may transmit in one of two ways. The station may transmit by contention-free communications started and controlled by a hybrid coordinator (HC). The HC may be a component of an access point or it may be a separate entity on the network. However, the HC should be part of the same BSS as the stations that it is controlling. Transmissions during contention-free communications are ensured to be free of collisions because only one station within a given BSS has access to the communications medium at a given time. During contention-free communications either the station containing the HC or the station polled by the HC can transmit at a given time. Once a station has been polled, it is given access to the medium for a specified amount of time and is free to transmit information to any destination for the specified duration.

Alternatively, the station may transmit by contention communications coordinated by the HC. In order to transmit by contention communications, the station must first determine if the medium is idle and its backoff timer must be zero. If either condition is not met, then the station cannot transmit. However, even if both conditions are met, collisions may still occur, since more than one station may have attempted to transmit at the same time. Transmissions by contention communications typically are afflicted with collisions that will require one or more retransmissions after an extended delay.

The present invention, as described below, is presented as an extension of an existing distributed coordination function (DCF) in the IEEE 802.11 technical standard. Therefore, for discussion purposes, terminology used in the discussion will reflect terminology used in the IEEE 802.11 technical standard. However, the ideas embodied in the present invention have application in other information networks where there is a desire to implement contention-free communications in a contention period. Therefore, the present invention should not be construed as being applicable only to a wireless network that adheres to the IEEE 802.11 technical standard.

According to the IEEE 802.11 technical standard, both contention-free and contention communications are supported. Contention-free communications is supported during a contention-free period (CFP) while contention communications is supported during a contention period (CP). Unfortunately for implementing QoS transfers, the CFP is an option in the IEEE 802.11 technical standard. Even if the CFP is provided, it uses a different set of access rules and frame formats than the CP. As a result, there are many IEEE 802.11 compliant wireless local area networks (LANS) that do not offer a contention-free period. In such networks, network latencies are generally large and spectrum utilization efficiencies are generally poor due to contention and collision.

Figure 2:
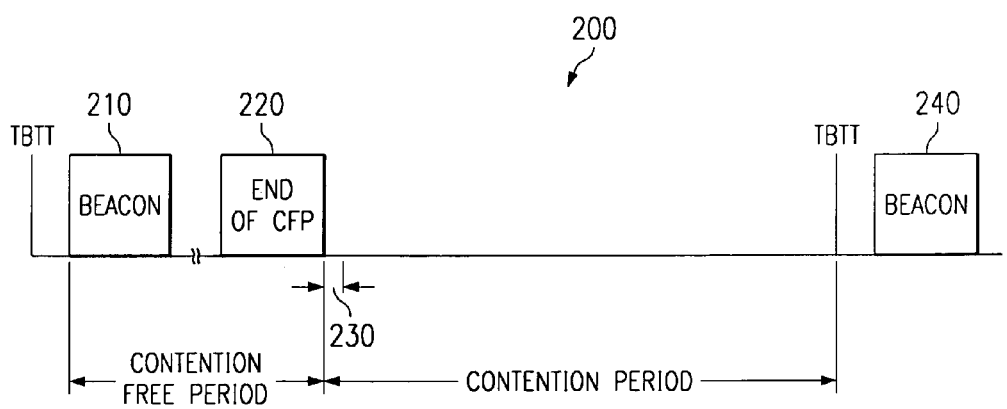
FIG. 2 is a diagram displaying the basic structure (prior art) of a beacon interval according to the IEEE 802.11 technical specifications, version 1999.

Referring now to FIG. 2, a diagram illustrates a basic frame structure for an IEEE 802.11 wireless LAN. The diagram displays a single beacon interval 200 as a function of time. A beacon interval 200 in an IEEE 802.11 wireless LAN begins with a target beacon transmission time (TBTT) that represents a desired (targeted) time for the appearance of a beacon frame 210. The beacon frame 210 denotes the actual beginning of a beacon interval 200 in an IEEE 802.11 wireless LAN.

According to the IEEE 802.11 technical standard, the beacon interval 200 can begin with a CFP that lasts for up to a specified maximum duration. However, the CFP may also be of duration zero (0). This means that the CFP may be non-existent. If the CFP is non-zero in duration, then the end of the CFP is marked by a CF-End frame 220.

The contention-free period, according to the IEEE 802.11 technical standards, allows for transmissions to occur within a BSS without the possibility of collisions from other transmissions from within the BSS. This is enabled by using a central controller, referred to as a point coordinator, that controls all transmissions in the BSS. The point coordinator is part of an access point in the BSS. The point coordinator may transmit a data frame from itself, or transmit a polling frame, or a polling frame with data, to a station in the BSS. The polled station transmits a MAC frame one SIFS time period after receiving the polling frame. If the station has more than one MAC frame for transmission, the station may send another request to the point coordinator to request additional time. The request may be piggybacked into the frame sent in response to the polling frame or it may be transmitted separately at a later time. After one station completes its transmission, the point coordinator allows itself or another station access to the communications medium.

The CF-End frame 220 marks the end of the CFP and the beginning of the CP. The duration of the CP is equal to the overall actual beacon interval duration minus the duration of the CFP. Therefore, the CP may last the entire beacon interval 200 (if there is no CFP).

The CP begins with the end of the CFP or the beacon frame 210 if there is no CFP. According to the IEEE 802.11 technical standard, a station in the BSS may begin to contend for access to the communications medium not earlier than one DIFS period after the communications medium becomes idle. In general, transmissions during the CP are achieved by waiting for the medium to become idle for at least one DIFS period.

In IEEE 802.1 1, the network designers are required to implement the contention access method but not necessarily the contention-free access method, since the former is specified to be mandatory and the latter is optional. According to the mandatory method, when a station has information to transmit, it checks the medium (for IEEE 802.11 in the United States, the medium spectrum are in the 2.4 and 5.7 GHz industrial-scientific-medical (ISM) frequency bands) to see if the medium is idle. The designers have defined two different states of idle. The first state of idle is known as "physical idle" and it is when there are no actual transmissions being performed on the medium. The second state of idle is known as "virtual idle" and it is when there are no anticipated transmissions from users on the medium. The medium busy time due to anticipated transmissions is encoded in a "duration" field of each transmitted frame, and is updated at listening stations with a "network allocation vector" (NAV). Both states of idle must be met for the medium to be considered idle.

Prior to a new transmission, the user selects a random backoff time from an interval [0, CW), which includes 0 but excludes CW, where CW=CWmin+1 for a new transmission and CWmin is a predetermined value that is specified in the technical specifications. The interval is commonly referred to as a contention window. This randomly selected backoff time is placed into a backoff timer that begins decrementing after the medium is determined to have been idle for a DIFS interval, where DIFS is also a predetermined value defined in the standard. However, the backoff timer only decrements when the medium remains idle (both states of idle). If the medium is no longer idle, then the backoff timer stops decrementing; the backoff timer resumes decrementing after the medium has become idle for a DIFS.

Once the backoff timer reaches zero, the user transmits a frame. If a collision occurs, the user selects a new random backoff time from a contention window that is twice as large as the previous contention window, [0, 2*CW). After the backoff timer expires with the new backoff time, the user transmits the same frame again. If the transmission fails yet again, the user selects another random backoff time from a contention window that is twice as large as the previous contention window, [0, 4*CW). When the contention window reaches a maximum size, [0, CWmax], where CWmax is yet another predetermined value specified in IEEE 802.11, the contention window will no longer increase in size, regardless of the occurrence of any future collisions of the frame. This backoff process is known as truncated binary exponential backoff and continues until the transmission is successful. The frame may be dropped if it reaches a retry limit or a maximum lifetime, which are values also defined by the IEEE 802.11 standard. After the frame is successfully transmitted or after the frame is dropped, the user will perform a new backoff chosen from the initial contention window [0, CW), with CW=CWmin+1, in preparation for the transmission of another new frame.

The end of the contention period is marked by another TBTT, at or after which a next beacon frame 240 may be transmitted by the point coordinator. The transmission from a station or/and its acknowledgment may go beyond the next TBTT, thus delaying the arrival of a next beacon frame.

As discussed previously, in the CP, a station with data to transmit may be required to wait a long period of time prior to being able to transmit. Additionally, the contention access algorithm as specified by the IEEE 802.11 technical standards is based purely on backoff. Therefore, there is no consideration given for how long a message has been waiting for transmission. Because of these factors and others, the CP as currently specified in the technical standards is not suitable for supporting traffic expecting performance guarantees.

Figure 3:
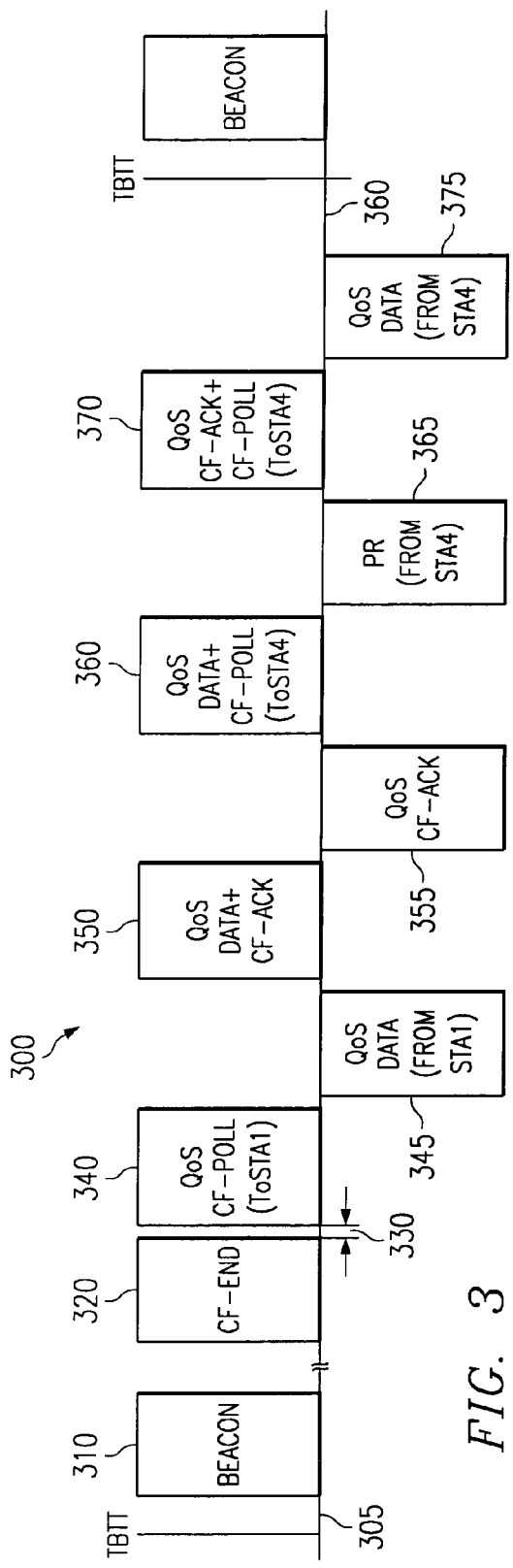
FIG. 3 is a diagram displaying the use of contention-free communications in a contention period according to a preferred embodiment of the present invention.

Referring now to FIG. 3, a time-space diagram illustrates contention-free communications implemented in a CP according to a preferred embodiment of the present invention. FIG. 3 illustrates the status of a single beacon interval 300 as a function of time, with frame traffic originating from an HC displayed above a horizontal line 305 and frame traffic originating from stations displayed below the horizontal line 305.

As discussed previously, the beacon interval 300 begins with a beacon 310 that also denotes the beginning of an optional contention-free period. If the communications frame has a contention-free period, then the end of the contention-free period is marked by an end of CFP frame 320. If there were no CFPs or if the CFP has ended, then a CP begins.

According to the IEEE 802.11 technical standard, once the CP begins, stations with traffic to transmit may begin contending for access to the communications medium one DIFS period after the medium becomes idle.

However, if the communications medium becomes busy again within one DIFS period, then none of the stations will be allowed to contend for access.

According to a preferred embodiment of the present invention, an HC, also sometimes interchangeably referred to as a centralized controller, an access point (AP), or an enhanced access point (EAP), may take control of the communications medium one PIFS period after the medium becomes idle. Therefore, if the HC transmits a MAC frame one PIFS period after the medium becomes idle, the HC obtains control of the medium, since the other stations will sense the medium to be busy one slot time later, that is, those stations will find the medium to be busy again within one DIFS period of the last transmission on the medium and thus will not transmit. Therefore, the HC essentially starts contention-free communications in the CP. Within the contention-free communications all frames are separated by one SIFS period, further preventing contention and collision by non-HC stations from occurring.

According to a preferred embodiment of the present invention, the HC may pre-empt contention for the communications medium by the stations in the BSS during the CP by transmitting after the medium is idle for a PIFS period 330 rather than a DIFS period (as is required for contending stations). With the HC in control of the communications medium, the HC can create contention-free transmissions for itself and for other stations in the BSS by polling. In another preferred embodiment of the present invention, the HC may start contention-free communications in the CP and preempt contention from other stations by transmitting after the medium has been idle for one SIFS period, following the end of a frame exchange sequence transmitted through contention access by stations within the same BSS.

After the medium has been idle for a PIFS or SIFS period as described above, the HC may send a broadcast (one source to all destinations) or multicast (one source to many destinations) QoS Data frame, a directed (one source to one destination) QoS Data frame, or a directed QoS {Data+}CF-Poll frame. The notation {Data+} means that the frame may optionally contain data, and if it does not, the present invention will remain operable. FIG. 3 displays a QoS CF-Poll frame 340 being transmitted to station 1 at the end of a PIFS idle period 330.

Inside the QoS CF-Poll frame 340, the HC specifies an amount of time, called a transmission window (TW), that has been reserved for the station (station 1). The TW is a sum of the amount of time allotted to the station plus the time required to transmit one QoS CF-Ack frame plus one SIFS period. The TW is equivalent to the amount of time that the HC has allotted for the station to transmit its data plus the amount of time to acknowledge receipt of is the transmission from the polled station (the time required to transmit one QoS CF-Ack frame) plus the amount of time the acknowledging station (HC or another station) waits (the SIFS period) prior to transmitting the QoS CF-Ack frame. The HC also specifies in the frame 340 a duration field equal to the value of TW plus one SIFS (the time between the end of the poll frame and the beginning of the poll response).

The polled station transmits a QoS Data frame 345 after one SIFS of receiving the poll frame, and may use all the specified time for its own transmission if the transmission requires no acknowledgment (i.e., no QoS CF-Ack frame will be returned). The station sets the duration field of the frame 345 to the duration value in the polling frame 340 minus the sum of one SIFS and the calculated transmission time of the frame 345. If the station sends more than one frame within a given TW, it will set the duration field in each successively transmitted frame equal to the duration value in the last transmitted frame subtracted by the sum of one SIFS and the transmission time of the frame to be sent. The station receiving a transmission from the polled station sends a QoS CF-Ack frame one SIFS after the end of that transmission if acknowledgment is required, setting the duration field in the QoS CF-Ack frame to zero or to a nonzero value if the HC is to transmit another frame within a SIFS or PIFS interval.

If the HC desires to retain control of the medium after the polled station has completed with its transmission and received its acknowledgment (if acknowledgment is required), the HC can send another frame to the same station or another station one SIFS later. The HC may use QoS Data+CF-Ack 350 to include data in an acknowledgment it is required to send to the previously transmitting station, setting the duration to be the transmission time of a QoS CF-Ack frame plus one SIFS. The receiving station, if required to acknowledge, will send a QoS CF-Ack frame 355 back to the HC one SIFS later, setting the duration field equal to zero. The HC may also send a QoS Data+CF-Poll 360 to any station (station 4), with the station responding one SIFS later with a QoS Data+CF-Ack frame, a reservation request (RR) frame, or a poll request PR frame 365, requesting for a larger transmission window.

Since not every station in the network has data to transmit, it would be inefficient for the HC to transmit QoS CF-Poll frames to each station in the network and allocating unneeded time on the communications medium. Instead, the HC maintains a list of stations that have data to transmit and wish to use contention free communications. Stations with a burst of data to transmit, i.e., at least two MSDUs, desiring to use contention-free communications, must request allocations of time from the HC. To do so, the station transmits a poll request (PR) to the HC. Poll requests may be transmitted to the HC via contention-free or contention communications. In each poll request, the station includes a field that contains an amount of time required to transmit the burst.

Stations with a single MSDU to transmit have an option of using contention-free communications. Although contention-free communications is not required for stations with more than one MSDU, the performance increase gained by using contention-free communications makes it much more desirable to use contention-free communications for cases where a station has more than one MSDU to transmit. The performance increase gained by using contention-free communications for a single MSDU is not as great and therefore, the decision to use contention-free communications is left up to the station. Of course, if a station needs to transmit the single MSDU by a certain time, it would be wise to use contention-free communications, regardless of any performance benefit that may result.

In FIG. 3, station 4 sent a PR frame 365 to the HC. Upon receipt of the PR, the HC sends a QoS {Data+}CF-Ack+CF Poll frame 370 to the station that had sent the PR frame. Included in the QoS {Data+}CF-Ack+CF-Poll frame is a transmission window that is less than or equal to the time needed to transmit the size of the burst indicated in the PR frame. Station 4 thus sends a QoS Data frame 375 one SIFS later. If needed, the HC will send more QoS {Data+}{CF-Ack+}CF-Poll frames to the station at a later time (depending on some scheduling or network load balancing algorithm executing in the HC), until the burst is empty. The HC releases the control of the communications medium at some point, allowing other stations to contend for access to the medium one DIFS after the end of the contention-free communications. However, the HC may regain the medium in the remaining CP 380 by transmitting a frame after one PIFS of medium idle interval, thus starting another mini-period of contention-free communications within the CP.

The use of poll request and poll frames is an efficient way to implement communications between the HC and a non-HC station. However, if there are more than two non-HC stations communicating together, then the use of poll requests and CF-Poll frames becomes inefficient and unwieldy due to the large number of poll requests and CF-Poll frames being transmitted.

To support this type of communications, the present invention provides for the use of tokens in contention-free communications. Tokens are received frames and some special qualifications that are used to determine if the receiving station has the right to transmit next. Only the station with the token may transmit. The token is passed from the first station to a second when the first station's transmission is complete.

According to a preferred embodiment of the present invention, the HC may allow a token-based communication structure to take place by transmitting a poll frame to a station with a More Data bit in the frame set to zero. With the More Data bit set to zero, the HC is not requiring the station to return a frame back to the HC, which would result in the HC regaining immediate control of the communications medium. Instead, the station is free to send a frame to another station.

Figure 4:
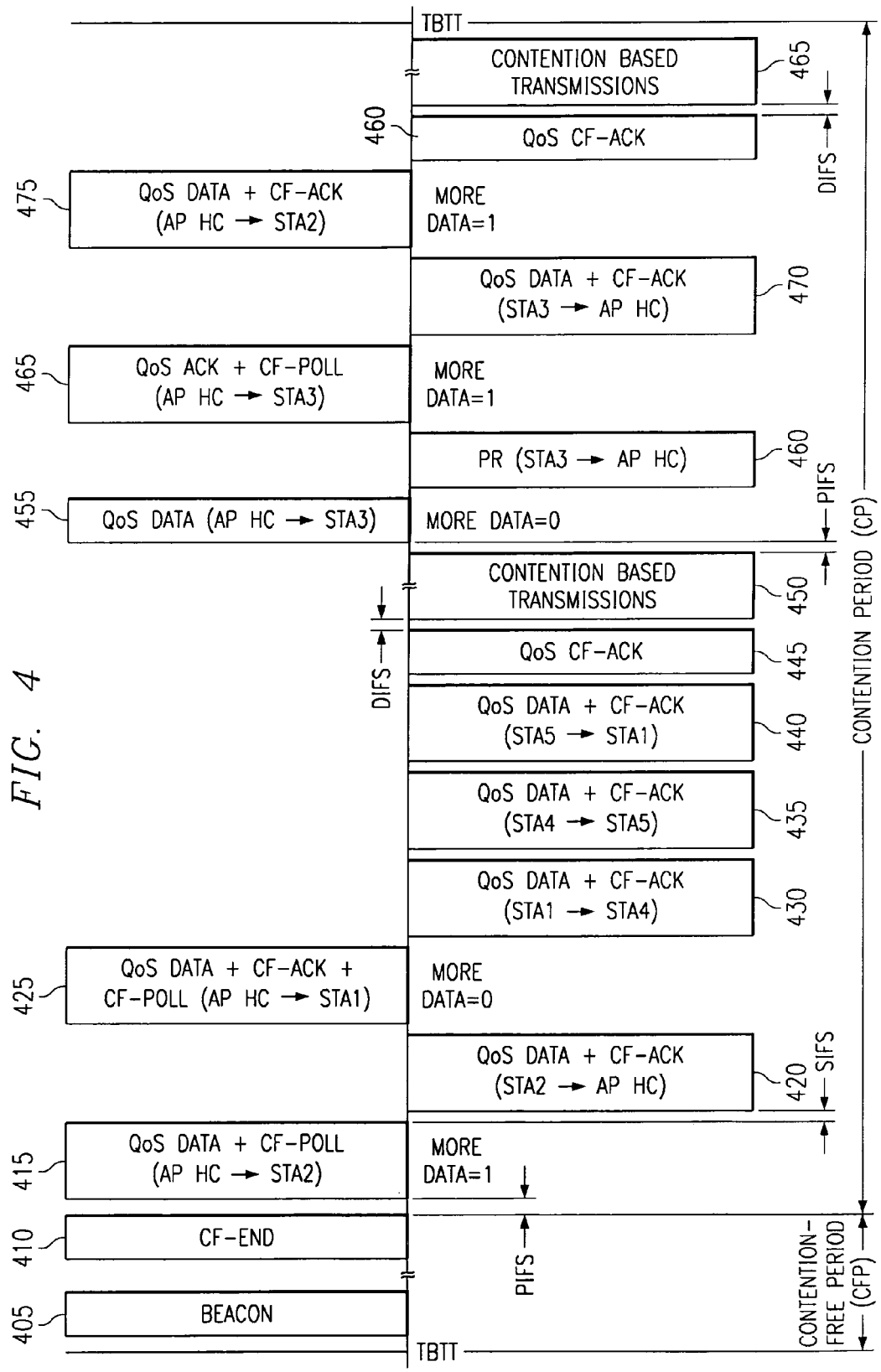
FIG. 4 is a diagram displaying contention-free communications using tokens during a contention period according to a preferred embodiment of the present invention.

Referring now to FIG. 4, a space-time diagram illustrates contention-free communications during a CP of a shared communications medium. FIG. 4 illustrates the status of a beacon interval as a function of time. At the beginning of the CP, the HC gains control of the communications medium by transmitting a QoS Data+CF-Poll frame 415 to station 2. In frame 415, the More Data bit is set to one, which will force station 2 to return control of the medium to the HC by sending a frame back to the HC but not to another station.

Station 2 responds to the QoS Data+CF-Poll by transmitting its data and returning a CF-Ack to the HC in frame QoS Data+CF-Ack 420. The HC then transmits a QoS Data+CF-Ack+CF-Poll frame 425 to station 1 where CF-Ack indicates receipt of the previous frame 420. In frame 425, the More Data bit is set to zero, which allows station 1 to transfer control of the communications medium to a station other than the HC. Station 1 transmits a QoS Data+CF-Ack frame 430 to station 4, where CF-Ack acknowledges receipt of the previous frame 425. Station 4 takes over the medium by transmitting a QoS Data+CF-Ack frame 435 to station 5, with the CF-Ack acknowledging receipt of the previous frame 430. Station 5 takes over now and continues the chain by transmitting a QoS Data+CF-Ack frame 440 back to station 1, also acknowledging station 4 for the frame 435. The chain ends when station 1 transmits a QoS CF-Ack frame 445 back to station 5.

According to a preferred embodiment of the present invention, there is no maximum to the number of stations permitted in chain of frames using tokens to pass control of the communications medium. However, an upper limit on the number of frames that can be transmitted is determined by the duration permitted the originating station by the HC, the duration of the CP, and ultimately the duration of a beacon interval. Because no data frames can be transmitted past the TBTT, a chain of frames using tokens can only be no longer in duration than a remaining CP.

According to another preferred embodiment of the present invention, a token using chain of frames ends when a station that has previously received a token receives a second frame in the same chain of frames. This means that a chain of stations using tokens for access control cannot transmit data frames to a station more than one time in a single chain.

The use of tokens is useful in applications such as voice telephony where a station transmits to another station and expects a response from that same station back. The use of tokens in these types of applications can reduce the control overhead and therefore increase the overall network throughput.

Referring back to FIG. 4, after the transmission of the QoS CF-Ack frame 445, the contention-free period ends. After a DIFS period of being idle, stations with traffic to transmit begin using contention communications. These stations either were not able to transmit a poll request to the HC or chose not to do so. Contention communications using contention access will be discussed later in the specification.

When contention communications completed, the HC regains control of the communications medium by transmitting a QoS Data frame 455 to station 3 at the end of a PIFS idle period. The transmission from the HC to station 3 begins a second contention-free communications period within the same CP. Station 3 replies to frame 455 with a poll request frame 460. The poll request frame 460 was transmitted during contention-free communications since station 3 had exclusive access to the communications medium. If station 3 had not been in exclusive access to the communications medium, station 3 would have had to wait until contention communications begins and attempt to transmit a poll request via contention communications.

In response to the poll request frame 460, the HC transmits a QoS CF-Ack+CF-Poll frame 465 to station 3. The CF-Ack is used as an acknowledgment for the poll request frame 460 while the CF-Poll gives station exclusive access to the communications medium for a specified amount of is time. Station 3 transmits its data and acknowledges the receipt of frame 465 with QoS Data+CF-Ack frame 470. The HC transmits data to station 2 and acknowledges the receipt of station 3's QoS Data frame 470 with a QoS Data+CF-Ack frame 475. A lone acknowledgment frame, QoS CF-Ack frame 480 is transmitted from station 2 to the HC to acknowledge the QoS Data+CF-Ack frame 475.

The second contention-free communication period ends. After another DIFS period of the communication medium being idle, a second contention communications period 485 begins. The second contention communications period 485 ends when it is determined that no data traffic can be transmitted prior to the arrival of the next TBTT.

Contention-free communications in the CP is intended primarily for the HC to send MPDUs and/or MMPDUs to stations and/or to poll stations for frame transfers from those stations. To a lesser extent, contention-free communications is for a station to use the receipt of a frame as a token to send an MPDU or an MMPDU. Since the primary purpose of contention-free communications is not for general communications in the network, it is possible that there is insufficient traffic for a contention-free communications period to consume an entire contention period.

FIG. 4 displays an example of the different communications methods that are permitted during the contention period and should be viewed as being only representative of what could actually happen during a contention period. However, there are no specific requirements that specify how many contention and contention-free periods should occur during a single contention period. If there were no need for contention-free communications during a contention period, then there would not be any contention-free communications during that contention period.

While contention-free communications is good for ensuring low-latency communications, a need is still present for contention communications. For short bursts or single frame transmissions, contention communications can be a good, low overhead way to transmit information. Additionally, in networks with a low to moderate number of stations, contention communications provides a simple method to reliably transmit data. Also, for stations that are not in a list of stations desiring contention-free communications, contention communications is required so that the station can transmit a poll request (PR) to the HC to be added to the list of stations desiring contention-free communications. Therefore, contention communications cannot be entirely eliminated.

According to a preferred embodiment of the present invention, contention communications categorizes the traffic in the network into different traffic categories that are then prioritized. The traffic categories are prioritized depending on desired performance levels for each category. For example, to provide a traffic category with a low overall network latency, a high priority is assigned. From the priorities, specific permission probabilities may then be assigned. Each traffic category receives a permission probability, $TCPP_i$, where $TCPP_i$ is the traffic category permission probability (TCPP) for the i-th traffic category. According to a preferred embodiment of the present invention, a centralized controller, such as the HC can be used to assign the TCPPs. According to another preferred embodiment of the present invention, the individual stations themselves are able to assign the TCPPs.

Regardless of which entity assigns the TCPPs, an important aspect of the present invention is that the changes of TCPPS are not fixed but adaptive. The TCPPs can and should be changed to reflect current network conditions. This adaptive nature helps the network react to changing network conditions and traffic loads. Updating the TCPPs may be performed at fixed time intervals or it may be performed when specific network performance metrics fall outside specified ranges. As with the assignment of the TCPPs discussed above, an HC or the individual stations may perform the updates.

Referring now to FIG. 5, a diagram illustrates an algorithm 500 employed by a contention station for contention communications using TCPPs executing on a station according to a preferred embodiment of the present invention. According to a preferred embodiment of the present invention, a station with frames of traffic queued in various traffic category queues calculates its overall permission probability, PP, by calculating a sum of the individual TCPPs (510). According to a preferred embodiment of the present invention, the traffic categories with empty queues have zeros assigned as their TCPPs.

The communications medium is then checked to see if it is idle (520) for the requisite period of time (e.g., a DIFS period). If the communications medium is busy, the algorithm 500 remains in block 520 to wait until the communications medium becomes idle. If the communications medium is idle, then the contending station checks to see if any of the TCPPs have been updated (530). As discussed above, the TCPPs may be updated by the HC or the individual stations.

If the TCPPs have been updated, the contending station recalculates the overall permission probability (540). The contending station then determines if it has permission to transmit a frame (550). To determine if it has permission to transmit, the contending station selects a random number, X, from the range [0, 1). This random number, X, is then compared against the overall permission probability. PP. If the random number, X, is less than or equal to the overall permission probability, PP, then the station has permission to transmit.

After being permitted to transmit, the contending station must select a frame from a traffic category queue and transmits it (560). The frame is selected from traffic category N, where N meets the criteria:

if $0<X<TCPP_l$, then $N=0$; else $$\text{if } \sum_{i=0}^{M-1} TCPP_i < X \leq \sum_{i=0}^{M} TCPP_i, \text{ then } N = M.$$

Here, $TCPP_i$ is the TCPP for traffic category i and is set to zero if traffic category i has no traffic to send from the station.

After transmitting the frame, the contending station waits for an acknowledgment (560). If the contending station receives an acknowledgment, the transmission was successful. If the contending station does not receive an acknowledgment, then the transmission was a failure and the contending station may attempt to retransmit the frame. According to a preferred embodiment of the present invention, the algorithm 500 treats the retransmission of the failed frame the same way as if the retransmission was an initial attempt at transmitting a frame.

After transmitting the frame and verifying the status of the transmission, the contending station checks to see if it needs to further contend for access to the communications medium (570). If there is no further need to contend, then the algorithm 500 terminates.

If, in block 550, the contending station was not permitted to transmit, then it checks to see if the time slot was idle (580). If the time slot was idle, is then the contending station can try to transmit again at the next time slot by returning to block 530. If the time slot had been busy, then the contending station must wait for the medium to become idle once again (520).

Referring now to FIG. 6, a diagram illustrates an algorithm 600 used by a contending station for contention communications using backoff executing on a station according to a preferred embodiment of the present invention. A station with frames of traffic queued in various traffic category queues calculates its overall permission probability, PP, by calculating a sum of the individual TCPPs and uses the overall permission probability to calculate a backoff time, J (610). The backoff time, J, is calculated using the expression:

$$J = \lfloor \log(X)/\log(1-PP) \rfloor$$

where $\lfloor Y \rfloor$ denotes the largest integer number not exceeding Y. According to a preferred embodiment of the present invention, the traffic categories with empty queues have zeros assigned as their TCPPs.

The communications medium is then checked to see if it is idle (620) for the requisite period of time (e.g., a DIFS period). If the communications medium is busy, the algorithm 600 remains in block 620 to wait until the communications medium becomes idle. If the communications medium is idle, then the contending station checks to see if any of the TCPPs have been updated (630). As discussed above, the TCPPs may be updated by the centralized controller or the individual stations.

If the TCPPs have been updated, the contending station recalculates the overall permission probability, PP, and the backoff time, J (640). The contending station then determines if it has permission to transmit a frame (650). The contending station loads the backoff time, J, into a backoff timer. The backoff timer decrements the value stored in it by one each time an idle slot passes. Therefore, the contending station is forced to wait J idle time slots before it is permitted to transmit.

After being permitted to transmit, the contending station must select a frame from a traffic category queue and transmits it (660). The frame is selected from traffic category N, where N meets the criteria:

if $0<C*X \leq TCPP_l$, then $N=0$; else $$\text{if } \sum_{i=0}^{M-1} TCPP_i < C*X \leq \sum_{i=0}^{M} TCPP_i, \text{ then } N = M.$$

Here, $$C = \sum_{i=0}^{Z} TCPP_i,$$

Z is the number of traffic categories, and $TCPP_i$ is set to zero for traffic categories having no traffic to send from the station.

After transmitting the frame, the contending station waits for an acknowledgment (660). If the contending station receives an acknowledgment, the transmission was successful. If the contending station does not receive an acknowledgment, then the transmission was a failure and the contending station may attempt to retransmit the frame. According to a preferred embodiment of the present invention, the algorithm 600 treats the retransmission of the failed frame the same way as if the retransmission was an initial attempt at transmitting a frame.

After transmitting the frame and verifying the status of the transmission, the contending station checks to see if it needs to further contend for the communications medium (670). If there is no further need to contend, then the algorithm 600 terminates.

If, in block 650, the contending station was not permitted to transmit, then it checks to see if the time slot was idle (680). If the time slot was idle, then the backoff timer decrements the value stored in it by one. The contending station can try to transmit again at the next time slot by returning to block 630. If the time slot had been busy, then the contending station must wait for the medium to become idle once again (620).

Figure 7B:
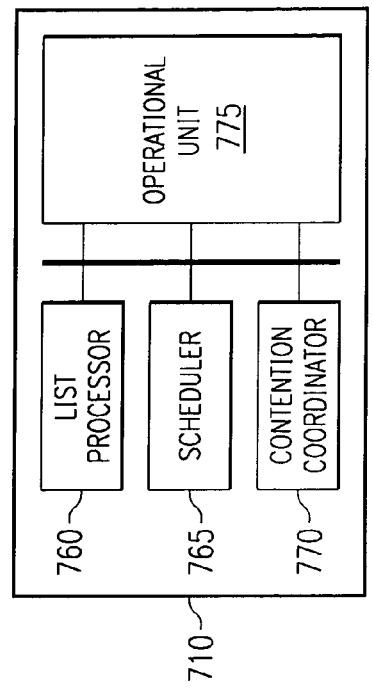
FIG. 7b is a block diagram illustrating a processor internal to the hybrid coordinator displayed in FIG. 7a according to a preferred embodiment of the present invention.
Figure 7A:
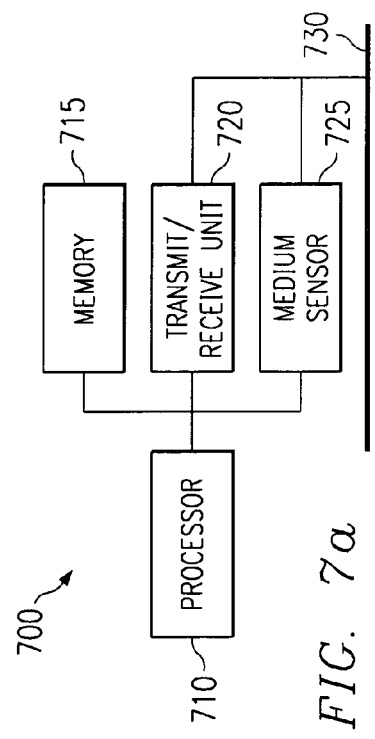
FIG. 7a is a block diagram illustrating a hybrid coordinator according to a preferred embodiment of the present invention.

Referring now to FIG. 7a, a block diagram illustrates an HC 700 with hardware support for contention-free communications during a contention period in accordance with a preferred embodiment of the present invention. The HC 700 has a processor 710 that is responsible for controlling the contention-free communications and for coordinating contention communications, which includes but is not limited to: maintaining a list of stations desiring contention-free communications, adding and removing stations from the list, scheduling the order in which stations in the list are served; and updating contention access parameters such as TCPPs or contention windows. The processor 710 is coupled to a memory unit 715 which can be used to store the list of stations desiring contention-free communications.

Also coupled to the processor is a transmit and receive unit 720, commonly referred to as a transceiver. The transmit and receive unit 720 is responsible for transmitting and receiving frames. Also coupled to the processor 710 is a medium sensor unit 725. The medium sensor unit 725 is responsible for detecting the state of a communications medium 730, either idle or busy. Coupled to the transmit and receive unit 720 and the medium sensor 725 is the communications medium 730.

According to a preferred embodiment of the present invention, the medium sensor unit 725, once it determines the state of the communications medium 730, places a value into a register inside the processor 710. For example, if the communications medium 730 is busy, then the medium sensor unit 725 will place a certain value into the register. The medium sensor unit 725 places a different value into the register if the communications medium 730 is idle. According to another preferred embodiment of the present invention, the medium sensor unit 725 asserts a medium status flag one way if the communications medium 730 is idle and another way if it is busy.

According to another preferred embodiment of the present invention, the medium sensor unit 725 is internal to the transmit and receive unit 720. With the medium sensor unit 725 inside the transmit and receive unit 720, the medium sensor unit 725 can make use of some of the hardware existing in the transmit and receive unit 720 to determine the state of the communications medium 730. For example, the medium sensor unit 725 may use portions of the receiver hardware to detect the status of the communications medium 730.

The communications medium 730 is shown in FIG. 7a as being a physical, wired connection. However, according to a preferred embodiment of the present invention, the communications medium 730 may be any medium that is capable of transmitting data. Examples of different possible communications medium include, but are not limited to: wire (power line, telephone line, twisted pair, coaxial cable, multi-conductor wire, etc.), fiber optics (single mode and multi-mode), wireless (radio frequency, infrared, microwave, laser light, etc.).

Referring now to FIG. 7b, a block diagram illustrates the processor 710 in greater detail. According to a preferred embodiment of the present invention, the processor 710 comprises a list processor 760, a scheduler 765, and a contention coordinator 770. The list processor 760, the scheduler 765, and the contention coordinator 770 may be functions executing inside the processor 710 or they may be dedicated hardware units inside the processor 710. The list processor 760, the scheduler 765, and the contention coordinator 770 are coupled to an operational unit 775 of the processor 710, sometimes called a control unit. The operational unit 775 is responsible for executing programs and performing functions such as coordinating interactions between various functional units of the processor 710. The operational unit 775 is, in turn, coupled to a bus connecting the processor 710 and its internal components to the remainder of the HC 700.

The list processor 760 is responsible for maintaining the list of stations desiring to transmit frames using contention-free communications. For example, when the processor 710 requests the list processor 760 for a station wanting contention-free communications, the list processor 760 provides it with the station and relevant information regarding the station's needs, including how many frames it needs to transmit and at what priorities, etc. When the HC 700 receives a poll request from a station, the HC 700 sends the request to the list processor 760 who stores the request in the list.

The scheduler 765 is responsible for ordering the stations and their requests for transmission time so that the service provided is fair and no station receives too much or too little of the network bandwidth. The scheduler 765 operates using a set of prespecified rules defining how to order requests of differing priorities and durations. According to a preferred embodiment of the present invention, the scheduler 765 places requests with higher priorities closer to the beginning of the list and requests for shorter durations are typically placed closer to the beginning of the list than requests for longer durations.

The contention coordinator 770 is responsible for updating the TCPPs used by stations for contention communications. Updating the TCPPs may be performed at fixed time intervals or it may be performed when specific network performance metrics fall outside specified ranges. The updated values may be broadcast via a beacon frame or another management frame.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for providing contention free transmission during a contention period in a shared communications medium comprising:
   (1) capturing the shared communications medium by transmitting a frame prior to the expiration of a point coordination function (PCF) interframe space (PIFS) period after the shared communications medium becomes idle;
   (2) permitting a recipient to transmit; and
   (3) recapturing the shared communications medium after the recipient transmits.

2. The method of claim 1, further comprises the step of (0) waiting for the shared communications medium to become idle prior to capturing the shared communications medium.

3. The method of claim 1, wherein the frame is transmitted by a hybrid controller.

4. The method of claim 3, wherein the frame is transmitted prior to the expiration of a short interframe space (SIFS) period after the shared communications medium becomes idle.

5. The method of claim 3, wherein the frame is a data frame.

6. The method of claim 3, wherein the frame is a control frame.

7. The method of claim 3, wherein the frame is a combination data and control frame.

8. The method of claim 3, further comprising the step of (8) repeating steps (1)–(3) after the shared communications medium has been idle for a PIFS period.

9. The method of claim 6, wherein the shared communications medium is shared by a plurality of stations, and wherein the control frame contains a duration specifying how long the recipient can transmit, and wherein the recipient may transmit frames to any station as long as the recipient can complete the transmission within the duration specified by the control frame.

10. The method of claim 9, wherein a station receiving a frame from the recipient may transmit frames to any station as long as the station can complete the transmission within the duration specified by the control frame.

11. The method of claim 10, wherein if a station receiving a frame has previously received a frame within the duration specified by the control frame, then the data transmission terminates, even if sufficient time remains in the duration specified by the control frame to transmit additional frames.

12. The method of claim 1, wherein the permitting step comprises:
   transmitting a frame by the recipient; and
   transmitting a frame by a hybrid controller.

13. The method of claim 12, wherein there are multiple traffic categories, and wherein the recipient may transmit a frame from any traffic category as long as the recipient can transmit the frame within a duration specified by a control frame.

14. The method of claim 12, wherein there are multiple traffic categories, and wherein the recipient may transmit multiple data frames of traffic from any traffic category as long as the recipient can transmit the frame within a duration specified by a control frame.

15. The method of claim 12, wherein the hybrid controller may begin transmitting a frame one SIFS period after the recipient finishes transmitting.

16. The method of claim 1, wherein the shared communications medium is shared by a plurality of recipients, and the method further comprises the step of repeating steps (2)–(3) until each recipient has transmitted all of its frames.

17. The method of claim 1, further comprising the step of repeating steps (2)–(3) until the contention period ends.

18. The method of claim 1, wherein the shared communications medium is shared by a plurality of recipients, and further comprising the step of (4) transmitting control frames to a second recipient after a first recipient has finished transmitting, even if the first recipient has additional frames to transmit.

19. The method of claim 18, further comprising the step of (5) repeating steps (2)–(4) until each recipient has transmitted all of its frames.

20. The method of claim 1, wherein a station becomes a recipient by sending a control frame to a hybrid controller.

21. The method of claim 20, wherein upon receipt of the control frame from the station, the hybrid controller places the station into a list of recipients.

22. The method of claim 1, further comprises the step of (6) releasing the communications medium after the contention-free transmission ends.

23. The method of claim 1, further comprises the step of (7) transmitting frames using contention access after the contention-free transmission ends.

24. The method of claim 23, wherein a hybrid controller coordinates the contention access by updating and broadcasting contention access parameters for use by contenting stations in contention communications.

25. The method of claim 24, wherein the updating and broadcasting are performed at fixed time intervals.

26. The method of claim 24, wherein the updating and broadcasting are performed when specific network performance metrics fall outside specified ranges.

27. A communication device comprising:
   means for capturing the shared communications medium by transmitting a first frame prior to the expiration of a point coordination function (PCF) interframe space (PIFS) period after the shared communications medium becomes idle;
   means for permitting a recipient to transmit; and
   means for recapturing the shared communications medium after the recipient transmits.

28. A device according to claim 27, wherein the frame is transmitted prior to the expiration of a short interframe space (SIFS) period after the shared communications medium becomes idle.

29. A device according to claim 27, further comprising:
   means for transmitting a second frame one SIPS period after the recipient finishes transmitting.

* * * * *